(12) United States Patent
Fang et al.

(10) Patent No.: US 11,087,605 B2
(45) Date of Patent: Aug. 10, 2021

(54) SMOKE DETECTION METHODOLOGY

(71) Applicant: Carrier Corporation, Palm Beach Gardens, FL (US)

(72) Inventors: Hui Fang, Shanghai (CN); Jie Xi, Shanghai (CN); Peter R. Harris, West Hartford, CT (US); Vivek Venugopalan, Bridgewater, NJ (US); David L. Lincoln, Johnston, RI (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 108 days.

(21) Appl. No.: 16/310,622

(22) PCT Filed: Jun. 15, 2017

(86) PCT No.: PCT/US2017/037659
§ 371 (c)(1),
(2) Date: Dec. 17, 2018

(87) PCT Pub. No.: WO2017/218763
PCT Pub. Date: Dec. 21, 2017

(65) Prior Publication Data
US 2019/0251816 A1     Aug. 15, 2019

Related U.S. Application Data

(60) Provisional application No. 62/350,418, filed on Jun. 15, 2016.

(51) Int. Cl.
*G08B 17/107* (2006.01)
*G01N 21/53* (2006.01)
(Continued)

(52) U.S. Cl.
CPC ........... *G08B 17/107* (2013.01); *G01N 21/53* (2013.01); *G08B 17/113* (2013.01); *G01N 2201/062* (2013.01); *G08B 21/182* (2013.01)

(58) Field of Classification Search
CPC .. G08B 17/107; G08B 17/113; G08B 21/182; G01N 2201/062; G01N 21/53
See application file for complete search history.

(56) References Cited

U.S. PATENT DOCUMENTS

| 5,642,099 A | 6/1997 | Nagashima |
| 6,914,535 B2 | 7/2005 | Matsukuma et al. |

(Continued)

FOREIGN PATENT DOCUMENTS

| CN | 105445234 A | 3/2016 |
| DE | 102011108389 A1 | 1/2013 |

(Continued)

OTHER PUBLICATIONS

Benjamin, Jeff, "meForAlarm: show how much time remains before your alarm sounds", available at: https://www.idownloadblog.com/2013/06/27/timeforalarm/, accessed: Dec. 11, 2018, 9 pages.

(Continued)

*Primary Examiner* — Brian A Zimmerman
*Assistant Examiner* — Kevin Lau
(74) *Attorney, Agent, or Firm* — Cantor Colburn LLP

(57) ABSTRACT

A system and method of detecting smoke including establishing a baseline measurement for each of at least three overlapping sensing volumes; comparing a measured reading within each of the at least three sensing volumes and the baseline measurements to determine whether the measured reading is within a sensing threshold, and annunciating a warning signal if the difference is outside the sensing threshold.

10 Claims, 4 Drawing Sheets

(51) Int. Cl.
*G08B 17/113* (2006.01)
*G08B 21/18* (2006.01)

(56) References Cited

U.S. PATENT DOCUMENTS

| | | | |
|---|---|---|---|
| 7,239,387 B2 | 7/2007 | Politze et al. | |
| 7,298,479 B2 | 11/2007 | Politze et al. | |
| 7,483,139 B2 | 1/2009 | Powell | |
| 7,777,634 B2 | 8/2010 | Kaelin et al. | |
| 7,978,087 B2 * | 7/2011 | Siber | G08B 17/107 |
| | | | 250/574 |
| 8,085,157 B2 | 12/2011 | Luterotti | |
| 9,036,150 B2 | 5/2015 | Wedler et al. | |
| 9,098,989 B2 | 8/2015 | Fischer | |
| 9,128,047 B2 | 9/2015 | Alexander et al. | |
| 9,142,112 B2 | 9/2015 | Erdtmann | |
| 9,818,277 B1 * | 11/2017 | Solh | G06K 9/00711 |
| 2007/0229824 A1 | 10/2007 | Politze et al. | |
| 2008/0258925 A1 | 10/2008 | Siber et al. | |
| 2010/0039645 A1 | 2/2010 | Ajay | |
| 2010/0118303 A1 | 5/2010 | Nagashima | |
| 2011/0221889 A1 * | 9/2011 | Knox | G01N 21/53 |
| | | | 348/135 |
| 2015/0346086 A1 * | 12/2015 | Erdtmann | G08B 17/107 |
| | | | 250/574 |
| 2015/0371515 A1 | 12/2015 | Zribi et al. | |

FOREIGN PATENT DOCUMENTS

| | | |
|---|---|---|
| EP | 2706515 A1 | 3/2014 |
| JP | S5288080 A | 7/1977 |

OTHER PUBLICATIONS

International Search Report and Written Opinion for application PCT/US2017/037659, dated Aug. 30, 2017, 13 pages.

Chinese Office Action; Application No. 201780050157; dated May 25, 2020; 9 pages.

* cited by examiner

SMOKE DETECTION METHODOLOGY

CROSS-REFERENCE TO RELATED APPLICATION

The present application is an international patent application, which claims priority to U.S. patent application Ser. No. 62/350,418, filed Jun. 15, 2016, which is herein incorporated in its entirety.

TECHNICAL FIELD OF THE DISCLOSED EMBODIMENTS

The presently disclosed embodiments generally relates to a method for recognizing fires according to the scattered light principle by pulsed emission of a radiation by measuring the radiation scattered off the particles located in measuring volumes. The present disclosure further relates to a scattered-light fire detector for performing this method.

BACKGROUND OF THE DISCLOSED EMBODIMENTS

Smoke sensors, such as commercial smoke sensors, often located inside of a housing or enclosure, use near infrared light, or lights of other wavelengths, scattering inside a small plastic chamber located inside of the enclosure, with inlets of controlled dimensions to prevent entry of unwanted particles. However, some unwanted airborne particles do make their way into the chamber, causing false alarms. Over time, these particles may also collect at the inlets of the sensor chamber, making it more difficult for smoke particles to diffuse into the chamber. Additionally, particles collecting on chamber surfaces may increase sensitivity thereby resulting in more frequent false or nuisance alarms.

A photoelectric sensor is operative on the basis of light scattering to detect particles as the particles travel through the chamber. From an efficiency perspective, detection is most efficient with particles that are at least the size of approximately one-half the wavelength of (visible) light—approximately 0.5 microns (or larger). Synthetic materials, which are increasingly being included in household items, may produce small particles that are less than 0.5 microns when burned. Such small particles may go undetected for a relatively long amount of time during a flaming fire. On the other hand, it may be difficult to distinguish the presence of large smoke particles (such as those particles that may be produced during a smoldering fire) from other objects or airborne particles. For example, it can be difficult to distinguish large particles resulting from a fire from steam or dust. Still further, it can be difficult to distinguish a fire from nuisance scenarios (e.g., cooking scenarios, such as operating a toaster, broiling a hamburger, pouring alcohol into a boiling pot, etc.).

To alleviate some of these issues, chamber-less smoke detectors may be used. However, with no chamber there is not a physically well-protected measurement volume, meaning a well-defined operational strategy is key to maintaining measurement integrity. Additionally, the lights used for detection are in some cases nearly constantly on and may provide a nuisance to users, and consumes more power. Therefore, there exists a need for improved chamber-less smoke detection.

SUMMARY OF THE DISCLOSED EMBODIMENTS

In one aspect, a chamber-less smoke detector is provided. The smoke detector includes a casing, a plurality of light sources disposed within the casing, the plurality of light sources configured to emit a light at different wavelengths, and a plurality of sensors disposed within the casing to establish at least three sensing volumes, the plurality of sensors configured to measure signals from the plurality of light sources at an angle of coincidence. In an embodiment, the method further includes annunciating a warning signal if the third reading is outside of the third sensing threshold, and the fourth reading is outside of the fourth sensing threshold.

In an embodiment, the plurality of light sources includes a first light source configured to emit an infrared light, and a second light source configured to emit blue visible light. In an embodiment, each of the plurality of sensors comprises a light sensing device. In an embodiment, the light sensing device comprises a photodiode.

In one embodiment, the plurality of sensors comprises a first light sensing device configured to form a first sensing volume, a second light sensing device configured to form a second sensing volume, and a third light sensing device configured to form a third sensing volume.

In an embodiment, the chamber-less smoke detector further includes a processing device in communication with the plurality of light sensing devices and the plurality of light sources. The processing device is configured to intermittently operate the plurality of light sources, store measurements from the plurality of sensors, and compare a current reading from the plurality of sensors to the stored measurements.

In one aspect, a method of operating the chamber-less smoke detector is provided. The smoke detector including at least three sensing volumes, the method including establishing a baseline measurement for each of the at least three sensing volumes, comparing a first reading of one of the at least three sensing volumes and one of the at least three baseline measurements to form a first detection measurement, and determining whether the first detection measurement is within a first sensing threshold, comparing first reading and a second reading of at least two of the at least three sensing volumes and at least two of the at least three baseline measurements to form the first detection measurement and a second detection measurement, and determining whether the first detection measurement and the second detection measurement are within the first sensing threshold and a second sensing threshold, and comparing a third reading and a fourth reading of one of the at least three sensing volumes and one of the at least three baseline measurements to form a third detection measurement and a fourth detection measurement, and determining whether the third detection measurement and the fourth detection measurement are within a third sensing threshold and a fourth sensing threshold.

In an embodiment, establishing a baseline measurement for each of the at least three sensing volumes includes intermittently operating at least one light source to emit a light, operating a plurality of light sensing devices to detect and measure the emitted light to establish the baseline measurement for each of the at least three sensing volumes, and operating a processing device to store the baseline measurement for each of the at least three sensing volumes. In one embodiment, intermittently operating at least one light source to emit a light includes emitting light of differing wavelengths. In one embodiment, intermittently operating at least one light source to emit a light includes emitting at least one of an infrared light and a blue light.

In an embodiment, operating a plurality of light sensing devices to detect and measure the emitted light to establish the baseline measurement for each of the at least three sensing volumes includes operating a first light sensing device defining a first sensing volume to establish a first baseline measurement, operating a second light sensing device defining a second sensing volume to establish a second baseline measurement, and operating a third light sensing device defining in a third sensing volume to establish a third baseline measurement and a fourth baseline measurement.

In an embodiment, comparing a first reading of one of the at least three sensing volumes and one of the at least three baseline measurements to form a first detection measurement includes intermittently operating the at least one light source to emit light for a second duration of time, operating the first sensing device forming the first sensing volume to detect and measure the light emitted from the at least one light source to establish the first reading, and operating the processing device to compare the first reading to the first baseline measurement.

In an embodiment, comparing first reading and a second reading of at least two of the at least three sensing volumes and at least two of the at least three baseline measurements to form the first detection measurement and a second detection measurement, and determining whether the first detection measurement and the second detection measurement are within the first sensing threshold and a second sensing threshold includes intermittently operating the at least one light source to emit light for a second duration of time, operating the second light sensing device forming the second sensing volume to detect and measure the light emitted from the at least one light source to establish the second reading, and operating the processing device to compare the second reading and the second baseline measurement.

In an embodiment, comparing a third reading and a fourth reading of one of the at least three sensing volumes and one of the at least three baseline measurements to form a third detection measurement and a fourth detection measurement, and determining whether the third detection measurement and the fourth detection measurement are within a third sensing threshold and a fourth sensing threshold includes intermittently operating the at least one light source to emit light for a third duration of time, operating the third light sensing device forming the third sensing volume to detect and measure the light emitted from the at least one light source to establish the third reading and the fourth reading, operating the processing device to compare the third reading to the third baseline measurement and the fourth reading to the fourth baseline measurement.

In another aspect, a method of operating a smoke detector including at least three sensing volumes is provided. The method includes establishing at least one baseline measurement for the at least three sensing volumes, operating in a detection mode, and determining whether at least one ratio measurement is within a ratio threshold. In an embodiment, the method further includes annunciating a warning signal if the at least one ratio measurement is greater than a ratio.

In an embodiment, establishing at least one baseline measurement for the at least three sensing volumes includes intermittently operating at least one light source to emit a light, operating a plurality of light sensing devices to detect and measure the emitted light in the at least three sensing volumes, and operating the processing device to store the at least one baseline measurement. In an embodiment, intermittently operating at least one light source to emit a light. In an embodiment, intermittently operating at least one light source to emit a light includes emitting light of differing wavelengths. In an embodiment, intermittently operating at least one light source to emit a light includes emitting at least one of an infrared light and a blue light.

In an embodiment operating in a detection mode includes intermittently operating at least one light source to emit a light, operating a plurality of light sensing devices to detect and measure the emitted light in the at least three sensing volumes to create at least one detection measurement, and operating the processing device to store the at least one detection measurement.

In an embodiment, determining whether at least one ratio measurement is within a ratio threshold includes operating the processing device to adjust the at least one detection measurement by the respective at least one baseline measurement to create at least one ratio measurement, and comparing the at least one ratio measurement to the ratio threshold.

DETAILED DESCRIPTION OF THE DISCLOSED EMBODIMENTS

Figure 1:
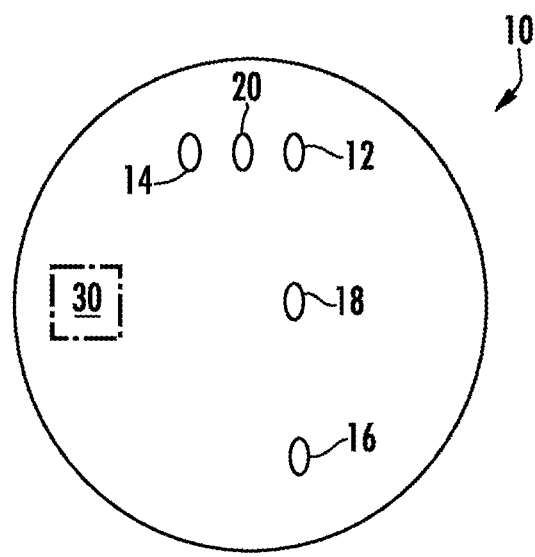
FIG. 1 illustrates a schematic diagram of a smoke detector according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates an exemplary embodiment of a smoke detector, generally indicated at 10. In an exemplary embodiment, the smoke detector 10 includes a chamber-less smoke detector. It will be appreciated that the chamber-less smoke detector may provide additional benefits which include reduction of transport time for smoke to reach the sensor elements to enable faster response/alarm times, improved sensitivity, manufacturability, and reproducibility, negligible directionality, ease of maintenance (with a transparent cover installed), and enhanced aesthetics (flush mount design) to name a few non-limiting examples.

The smoke detector 10 includes a plurality of light sources and a plurality of light sensing devices. In an embodiment, the plurality of light sources includes a first light source 12 and a second light source 14. The first light source 12 and the second light source 14 may include a light emitting diode (LED). The first light source 12 and the second light source 14 may emit light at one or more wavelengths. In an embodiment, the first light source 12 may emit light of wavelengths characteristic of infrared light, and the second light source 14 may emit light of wavelengths characteristic of blue visible light. The infrared light may be used in the detection and false alarm discrimination of smoke, and the blue visible light may be used in the false alarm discrimination of smoke.

In an embodiment, the plurality of light sensing devices includes a first light sensing device 16, a second light sensing device 18, and a third light sensing device 20 located within different regions of the smoke detector 10 with a line of sight of the light emitted from the first light source 12 and the second light source 14. The overlap of the field of view of the first light sensing device 16, second light sensing device 18, and third light sensing device 20 with the emissions of the first light source 12 and the second light source 14 form different overlapping sensing volumes. The plurality of light sensing devices are configured to measure signals from the first light source 12 and the second light source 14.

Figure 2:
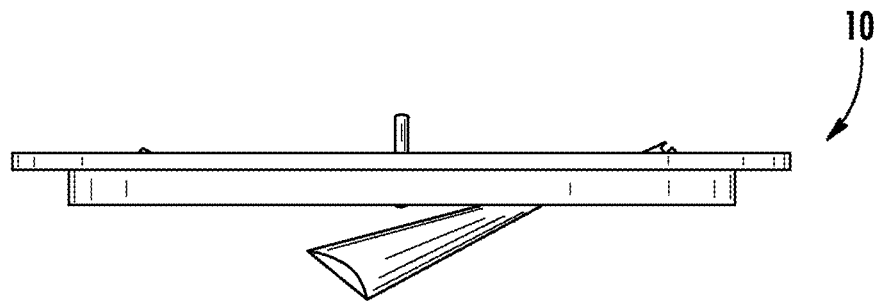
FIG. 2 illustrates a side view of the smoke detector forming a first sensing volume according to one embodiment of the present disclosure.

In an embodiment, the first light sensing device 16, second light sensing device 18, and third light sensing device 20 includes photodiodes. For example, the first light sensing device 16 may be used to define a forward-scatter sensing detection volume formed by the overlap of the emission from the first light source 12 and the second light source 14 having a first angle of coincidence (shown in FIG. 2). In the embodiment shown in FIG. 2, the first angle of coincidence is approximately 130 degrees with the first light sensing device 16. It will be appreciated that other values or angles may be used in some embodiments. The angle of coincidence may be defined as the angle between the symmetry axis of the light cone of the first light source 12 and the second light source 14, and the symmetry axis of the acceptance cone of the light sensing device 16, 18, 20, where 180 degrees may be defined where the light source 12, 14 is pointed directly at the light sensing device 16, 18, 20. It will be appreciated that the scattering angle of light may be calculated by subtracting the angle of coincidence from 180 degrees.

Figure 3:
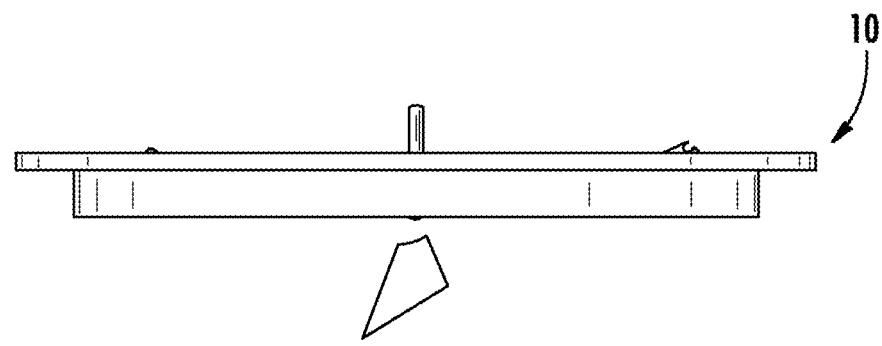
FIG. 3 illustrates a side view of the smoke detector forming a second sensing volume according to one embodiment of the present disclosure.

The second light sensing device 18 may be used to define a first back-scatter sensing detection volume formed by the overlap of the emission from of the first light source 12 and the second light source 14 having a second angle of coincidence 26 with second light sensing device 18. In the embodiment shown in FIG. 3, the second angle of coincidence is approximately 65 degrees. It will be appreciated that other values or angles may be used in some embodiments.

Figure 4:
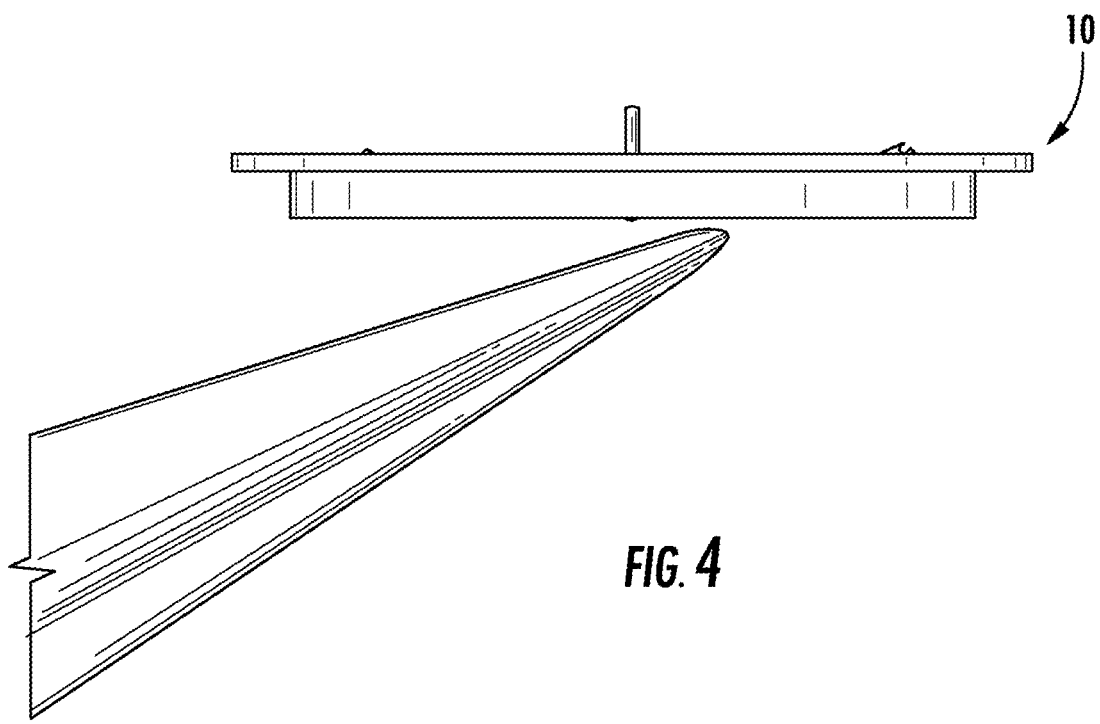
FIG. 4 illustrates a side view of the smoke detector forming a third sensing volume with a light of one wavelength according to one embodiment of the present disclosure.
Figure 5:
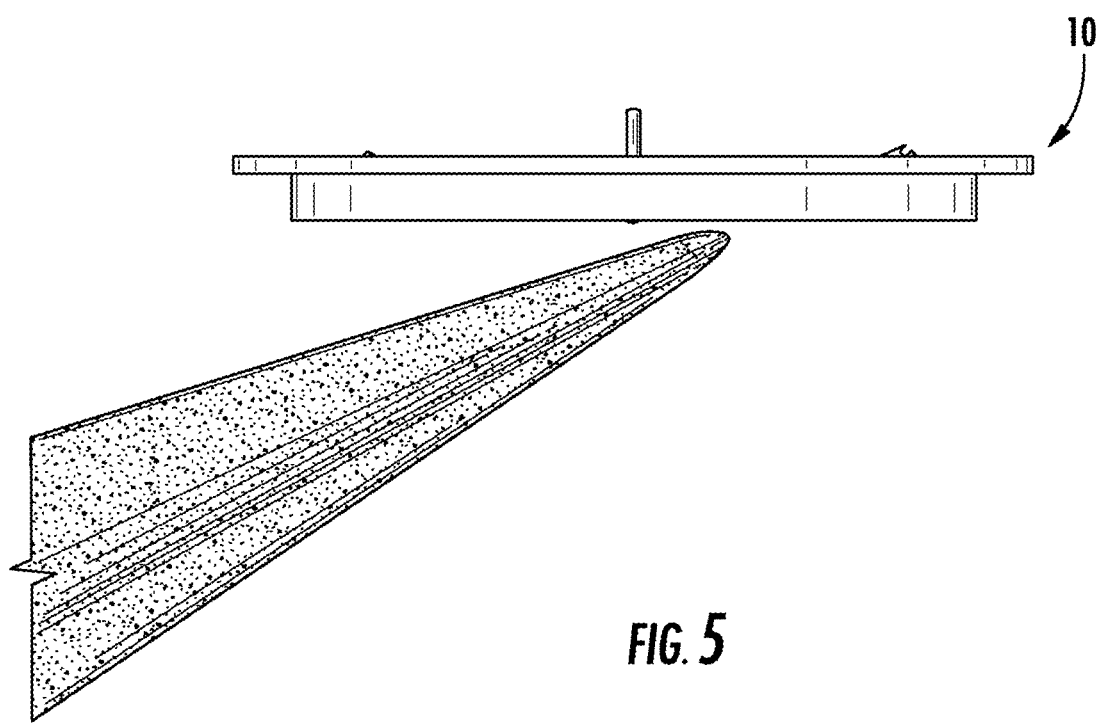
FIG. 5 illustrates a side view of the smoke detector forming a third sensing volume with a light of another wavelength according to one embodiment of the present disclosure.

The third light sensing device 20 may be used to define a second back-scatter sensing detection volume formed by the overlap of the emission from the first light source 12 and the second light source 14 having a third angle of coincidence (shown in FIGS. 4-5) with the third light sensing device 20. In the embodiments shown in FIGS. 4-5, the third angle of coincidence is approximately 0 degrees.

The smoke detector 10 further includes a processing device 30 in electrical communication with the plurality of light sources and the plurality of sensors. The processing device 30 includes a memory (not shown) capable of storing executable instructions. The executable instructions may be stored or organized in any manner and at any level of abstraction, such as in connection with one or more applications, processes or routines to analyze the signals detected by the plurality of sensors to make alarm decisions after preset threshold levels are reached according to the method described herein.

Figure 6:
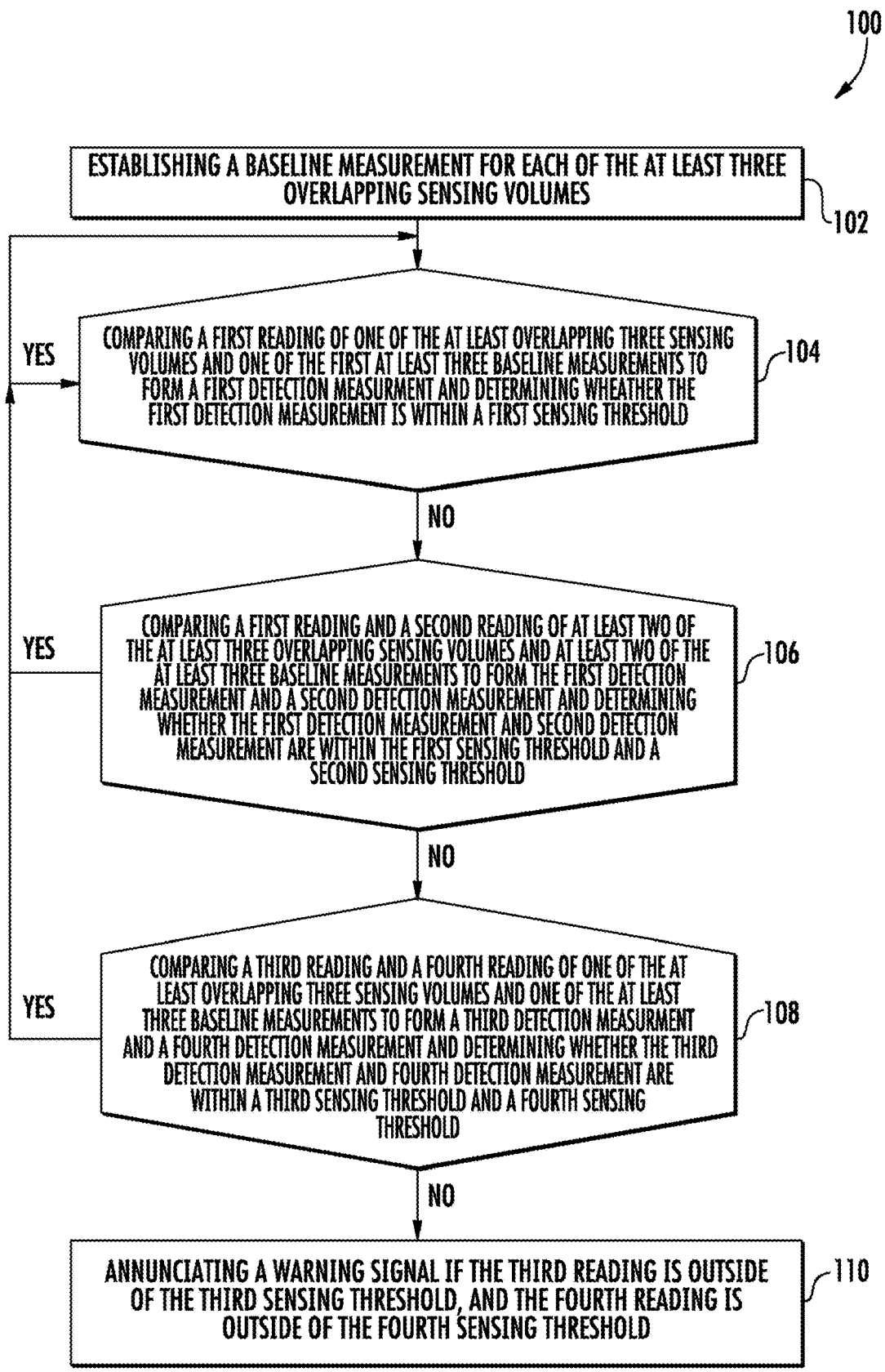
FIG. 6 illustrates a schematic flow diagram of a method for detecting smoke according to one embodiment of the present disclosure.

FIG. 6 illustrates a method of detecting smoke, the method generally indicated at 100. The method includes step 102 of establishing a baseline measurement for each of the at least three sensing volumes. In an embodiment, the smoke detector 10 establishes a baseline measurement by intermittently operating at least one of the first light source 12 and the second light source 14, to emit a light. In an embodiment, the first light source 12 may emit an infrared light, and the second light source may emit a blue visible light.

In an embodiment, the first light source 12 and the second light source 14 may emit light independently, or in tandem, for 2-50 bursts lasting for approximately 2-23 microseconds. It will be appreciated that the first light source 12 and the second light source 14 may emit more than 50 bursts and last more than 23 microseconds or less than 2 microseconds.

The plurality of sensors 16, 18, 20 operate to detect and measure the emitted light to establish the baseline measurement for each of the at least three sensing volumes, respectively. The processing device 30 operates to store the baseline measurements for each of the at least three sensing volumes.

To establish the baseline measurement for the forward-scatter sensing volume, the light sensing device 20 operates to detect the emitted light from the sequenced first light source 12 and the second light source 14, and converts the incident light into an electric characteristic by reading the light sensing device 20 that is also used for measuring the emitted light in the forward-scatter sensing detection volume. It will be appreciated that the light sensing device 20 used to detect the emitted forward-scattered light may not have a filter, and includes a large acceptance bandwidth. In an embodiment, the electrical characteristic includes a current or a voltage. The measured characteristic is then stored into the memory of the processing device 30. The first light sensing device 16 and second light sensing device 18 operate in a similar fashion to establish the baseline measurements in the first back-scatter sensing detection volume and second back-scatter sensing detection volume, respectively.

It will be appreciated that the smoke detector 10 may operate periodically (e.g. every 30 minutes) to update the baseline measurement within each of the sensing volumes by taking an average of the stored baseline measurements and the current readings within each sensing volume.

The method 100 further includes step 104 of comparing a first reading of one of the at least three sensing volumes and one of the at least three baseline measurements to form a first detection measurement, and determining whether the first detection measurement is within a first sensing threshold. In an embodiment, comparing a first reading of one of the at least three sensing volumes and one of the at least three baseline measurements to form a first detection measurement includes intermittently operating the at least one light source 12, 14 to emit light for a second duration of time, operating at least one of the light sensing devices 16, 18, 20, for example the first light sensing device 16, forming the forward-scatter sensing detection volume to detect and measure the light emitted from the at least one light source 12, 14 to establish the first reading; and operating the processing device 30 to compare the first reading to the first baseline measurement.

For example, during its normal state of operation, the smoke detector 10 may operate the first light source 12 (i.e., infrared light) in a burst or multiple bursts of 1-50 pulses, each lasting for approximately 2-23 microseconds. It will be appreciated that the first light source 12 may emit more than 50 pulses and last more than 23 microseconds or less than 2 microseconds. It will be appreciated that the smoke detector 10 may periodically operate in the normal state (e.g. performing pulses of measurements every 1-5 seconds) to monitor the area for the presence of smoke.

The first light sensing device 16, forming the forward-scatter sensing detection volume, operates to detect the emitted light from the first light source 12 and converts the incident light into an electric characteristic. The measured electrical characteristic is compared, by the processing device 30, to the stored baseline electrical characteristic for the forward-scatter sensing detection volume to determine whether the measured electrical characteristic is within a first sensing threshold of the stored baseline electrical characteristic. If the measured electrical characteristic is within the first threshold limit, the step repeats.

If the measured electrical characteristic is outside of the first sensing threshold, it is an indication that smoke may be present, and the method moves to step 106 of comparing the first reading and a second reading of at least two of the at least three sensing volumes and at least two of the at least three baseline measurements to form the first detection measurement and a second detection measurement, and determining whether the first detection measurement and the second detection measurement are within the first sensing threshold and a second sensing threshold. In an embodiment, comparing the first reading and a second reading of at least two of the at least three sensing volumes and at least two of the at least three baseline measurements to form the first detection measurement and the second detection measurement includes intermittently operating the at least one light source 12, 14 to emit light for a second duration of time, operating the second light sensing device 18 forming the first back-scatter sensing detection volume to detect and measure the light emitted from the at least one light source 12, 14 to establish the second reading, and operating the processing device 30 to compare the second reading to the second baseline measurement.

For example, if there is a change in measured light in the forward-scatter sensing detection volume, the smoke detector 10 may operate the first light source 12 (i.e., infrared light) in a burst or multiple bursts of 1-50 pulses, each lasting for approximately 2-23 microseconds. It will be appreciated that the first light source 12 may emit more than 50 pulses per burst and last more than 23 microseconds or less than 2 microseconds.

The second light sensing device 18, forming the first back-scatter sensing detection volume, operates to detect the emitted light from the first light source 12 and converts the incident light into an electric characteristic. The measured electrical characteristic is compared, by the processing device 30, to the stored baseline electrical characteristic for the first back-scatter sensing detection volume to determine whether the measured electrical characteristic is within a second sensing threshold of the stored baseline current for the first back-scatter sensing detection volume. If the measured electrical characteristic is within the second sensing threshold, the method returns to step 104, as it may be an indication of a false alarm scenario.

If the measured electrical characteristic is outside of the first sensing threshold and second sensing threshold, it is an indication that smoke may be present, and the method moves to step 108 of comparing a third reading and a fourth reading of one of the at least three sensing volumes and one of the at least three baseline measurements to form a third detection measurement and a fourth detection measurement, and determining whether the third detection measurement and the fourth detection measurement are within a third sensing threshold and fourth sensing threshold, respectively. The third reading and the fourth reading are taken from a third of the at least three sensing volumes. In an embodiment, comparing a third reading and the fourth reading of one of the at least three sensing volumes and one of the at least three baseline measurements is within the third sensing threshold and the fourth sensing threshold, respectively, includes intermittently operating the at least one light source 12, 14 to emit light for a third duration of time, operating the third light sensing device 20, forming the second back-scatter sensing detection volume, to detect and measure the light emitted from the at least one light source 12, 14 to establish the third reading and the fourth reading. The processing device 30 compares the third reading to the third baseline measurement and the fourth reading to the fourth baseline measurement.

For example, if there is a change in measured light in the first back-scatter sensing detection volume, the smoke detector 10 may operate the first light source 12 (i.e., infrared light) and the second light source 14 (i.e., blue visible light) in a burst of multiple bursts of 1-50 pulses, each lasting for approximately 2-23 microseconds. It will be appreciated that the first light source 12 and the second light source 14 may emit more than 50 pulses per burst and last more than 23 microseconds or less than 2 microseconds.

The third light sensing device 20, forming the second back-scatter sensing detection volume, operates to detect the emitted light from the first light source 12 and the second light source 14, and converts the incident light into electric characteristics. The measured electrical characteristics are compared, by the processing device 30, to the stored baseline electrical characteristics for the second back-scatter sensing detection volume to determine whether the measured electrical characteristics are within the third sensing threshold (e.g., for the infrared light) and the fourth sensing threshold (e.g. for the blue visible light) of the baseline electrical characteristics for the second back-scatter sensing detection volume, respectively. If the measured electrical characteristics are within the third threshold limit and fourth threshold limit, the step returns to step 104, as it may be an indication of a false alarm scenario.

If the measured electrical characteristics are outside of the third sensing threshold and the fourth sensing threshold, it is an indication that smoke is present, and in an embodiment the method 100 moves to step 110 annunciating a warning signal for the presence of smoke.

Figure 7:
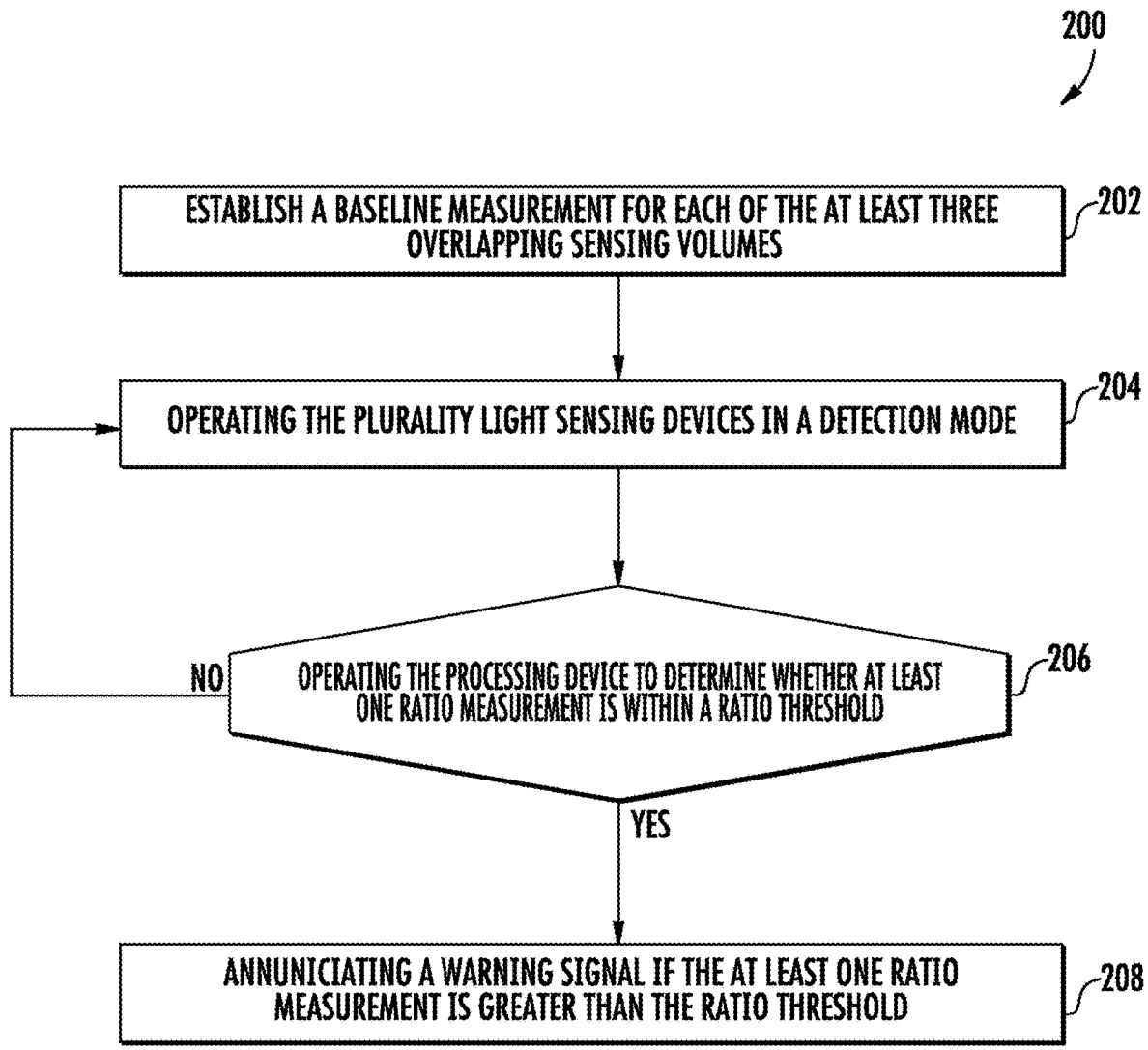
FIG. 7 illustrates a schematic flow diagram of a method for detecting smoke according to one embodiment of the present disclosure.

FIG. 7 illustrates an exemplary method of detecting smoke, the method generally indicated at 200. The method includes step 202 of establishing a baseline measurement for each of the at least three sensing volumes. In an embodiment, the smoke detector 10 establishes a baseline measurement by intermittently operating at least one of the first light source 12 and the second light source 14, to emit a light. In an embodiment, the first light source 12 may emit an infrared light, and the second light source may emit a blue visible light.

In an embodiment, the first light source 12 and the second light source 14 may emit light independently, or in tandem, in a burst or multiple bursts of 1-50 pulses, each lasting for approximately 2-23 microseconds. It will be appreciated that the first light source 12 and the second light source 14 may emit more than 50 pulses per burst and last more than 23 microseconds or less than 2 microseconds.

The plurality of light sensing devices 16, 18, 20 operate to detect and measure the emitted light for each of the at least three sensing volumes, respectively. The processing device 30 calculates the ratio of light detected within each of the at least three sensing volumes to create and store at least one baseline measurement.

To establish the baseline measurement for the forward-scatter sensing volume, the light sensing device 16 operates to detect the emitted light from the sequenced first light source 12, and converts the incident light into an electric characteristic by reading the light sensing device 16 that is also used for measuring the emitted light in the forward-scatter sensing detection volume. It will be appreciated that the light sensing device 16 used to detect the emitted forward-scattered light may have a filter, and includes a narrow acceptance bandwidth. In an embodiment, the electrical characteristic includes a current or a voltage. It will be appreciated that the smoke detector 10 may operate periodically (e.g. every 30 minutes) to update the baseline measurement by taking an average of the stored baseline measurements and the current readings within each sensing volume.

The method 200 further includes step 204 of operating the plurality light sensing devices 16, 18, 20 in a detection mode. In an embodiment, operating the plurality of light sensing devices 16, 18, 20 in a detection mode includes intermittently operating the at least one light source 12, 14 to emit light for a detection duration of time, operating the plurality of light sensing devices 16, 18, 20 to detect and measure the light emitted from the at least one light source 12, 14 to establish a plurality of light measurements.

In an embodiment, the plurality of light measurements includes a light measurement from each of the at least three sensing volumes. The processing device 30 calculates the ratio of light measurements within each of the at least three sensing volumes to create and store at least one detection measurement.

For example, during its normal state of operation, the smoke detector 10 may operate the first light source 12 (i.e., infrared light) and/or second light source 14 (i.e. blue light) in a burst or multiple bursts of 1-50 pulses, each lasting for approximately 2-23 microseconds. It will be appreciated that the first light source 12 and/or second light source may emit more than 50 pulses per burst and last more than 23 microseconds or less than 2 microseconds. It will be appreciated that the smoke detector 10 may periodically operate in the normal state (e.g. performing bursts of measurements every 1-5 seconds) to monitor the area for the presence of smoke.

The light sensing device 16, forming the forward-scatter sensing detection volume, the second light sensing device 18, forming the first back-scatter sensing detection volume, and the third light sensing device 20, forming the second back-scatter sensing detection volume each operate to detect the emitted light from the first light source 12 and/or second light source 14 and converts the incident light into electric characteristics.

The method 200 further includes step 206 of operating the processing device 30 to determine whether a ratio measurement is within a ratio threshold. In an embodiment, the smoke detector 10 may perform a first detection measurement of one of the at least three sensing volumes and adjust it by its respective baseline measurement and perform a second detection measurement of one of the at least three sensing volumes adjusted by its respective baseline measurement. The first ratio measurement may be determined by calculating the ratio of the adjusted first detection measurement to the adjusted second detection measurement. If the first ratio measurement is within the first ratio threshold, the method returns to step 204, as it may be an indication of a false alarm scenario.

If the first ratio measurement is outside of the first ratio threshold, it is an indication that smoke may be present, and the method moves to step 208 of annunciating a warning signal for the presence of smoke.

It will be appreciated that any number of ratio measurements of any combination of the at least three sensing volumes adjusted by their respective baseline measurement and corresponding ratio thresholds can be added to enhance false alarm resistance and improve detection performance.

In another example, the smoke detector 10 may perform a first detection measurement of one of the at least three sensing volumes and adjust it by its respective baseline measurement and perform a second detection measurement of one of the at least three sensing volumes adjusted by its respective baseline measurement. The first ratio measurement may be determined by calculating the ratio of the adjusted first detection measurement to the adjusted second detection measurement.

If the first ratio measurement is within the first ratio threshold, the method returns to step 204, as it may be an indication of a false alarm scenario. In an embodiment, if the first ratio measurement is outside of the first ratio threshold, it is an indication that smoke may be present, and the method performs a third detection measurement of one of the at least three sensing volumes adjusted by its respective baseline measurement and perform a fourth detection measurement of one of the at least three sensing volumes adjusted by its respective baseline measurement.

If the ratio measurement is within the first ratio threshold, the method returns to step 204, as it may be an indication of a false alarm scenario. In an embodiment, if the ratio measurement is outside of the first ratio threshold, it is an indication that smoke may be present, and the method performs a third detection measurement of one of the at least three sensing volumes adjusted by its respective baseline measurement and perform a fourth detection measurement of one of the at least three sensing volumes adjusted by its respective baseline measurement.

The second ratio measurement is determined by calculating the ratio of the adjusted third detection measurement to the adjusted fourth detection measurement. If the second ratio measurement is within the second ratio threshold, the method returns to step 204, as it may be an indication of a false alarm scenario.

It will therefore be appreciated that the present disclosure provides an improved smoke detector 10 including at least three light sensing device 16, 18, 20, each forming multiple overlapping sensing volumes, to detect and measure intermittently operated light emitted from the first light source 12 and/or second light source 14 at multiple angles of coincidence and multiple wavelengths to enhance false alarm resistance (e.g. due to solid objects), provide more accurate particle sizing information, and result in a detector with negligible directionality (when using multiple scattering angles). Moreover, multiple scattering angles and wavelengths both enable particle sizing, resistance to false alarms (e.g. solid objects, ambient light, cooking scenarios, etc.), and identification/discrimination of different smoke types (e.g. enables the option for user to set sensitivity for different smoke types).

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. A method of operating a chamber-less smoke detector, the chamber-less smoke detector including at least two light sources, wherein a first light source of the at least two light sources is configured to emit infrared light and a second light source of the at least two light sources is configured to emit visible light,
at least three light sensing devices within different regions of the smoke detector, wherein each comprises a photodiode, and
at least three sensing volumes, wherein each one of the at least three sensing volumes is formed by an overlap of emissions from the at least two light sources having a mutually unique angle of coincidence with a respective one of that at least three light sensing devices,
wherein:
  a first light sensing device of the at least three light sensing devices defines a forward-scatter sensing detection volume formed by and overlap of emissions from the first light source and the second light source, wherein the first and second light sources have a first angle of coincidence with the first light sensing device;
  a second light sensing device of the at least three sensing devices defines a first back-scatter sensing detection volume formed by an overlap of emissions from of the first light source and the second light source, wherein the first and second light sources have a second angle of coincidence with the second light sensing device; and
  a third light sensing device of the at least three light sensing devices defines a second back-scatter sensing detection volume formed by an overlap of emissions from the first light source and the second light source, wherein the first and second light sources have a third angle of coincidence with the third light sensing device, wherein the first, second and third and third angles of coincidence differ from each other,
the method comprising:
  (a) establishing and periodically updating a baseline measurement for each of the at least three sensing volumes by:
  establishing a first baseline measurement for the forward-scatter sensing detection volume by: intermittently operating the first and the second light sources, in sequence; and converting the incident light into an electric characteristic via the first light sensing device;
  establishing a second baseline measurement for the first back-scatter sensing detection volume by: intermittently operating the first and the second light sources, in sequence; and converting the incident light into an electric characteristic via the second light sensing device;
  establishing a third and fourth baseline measurements for the second back-scatter sensing detection volume by: intermittently operating the first and the second light sources, in sequence; and converting the incident light into an electric characteristic via the third light sensing device;
  operating a processing device to store the baseline measurement for each of the at least three overlapping sensing volumes;
  (b) comparing a first reading of the forward-scatter sensing detection volume and the first baseline measurements to form a first detection measurement, and
  determining whether the first detection measurement is within a first sensing threshold of the first baseline;
  (c) when the first detection measurement is within a first sensing threshold of the first baseline;
  comparing first reading and a second reading of the forward-scatter sensing detection volume and the first back-scatter sensing detection volume and the first and second baseline measurements to form the first detection measurement and a second detection measurement; and
  determining whether the first detection measurement and the second detection measurement are within the first sensing threshold and a second sensing threshold of the first and second baselines, respectively;
  (d) when the first and second detection measurements are outside of the first and second sensing thresholds of the first and second baselines, respectively;
  comparing a third reading and a fourth reading of the second back-scatter sensing detection volume and the third and fourth baseline measurements to form a third detection measurement, and a fourth detection measurement; and
  determining whether the third detection measurement and the fourth detection measurement are within a third sensing threshold and a fourth sensing threshold of the third and fourth baselines, respectively, to thereby determine whether there is smoke,
  wherein the third sensing threshold is directed to infrared light and the fourth sensing threshold is directly to visible light.

2. The method of claim 1, wherein step (b) comprises:
  (i) intermittently operating the at least one light source to emit light for a second duration of time;
  (ii) operating the first sensing device forming the first sensing volume to detect and measure the light emitted from the at least one light source to establish the first reading; and
  (iii) operating the processing device to compare the first reading to the first baseline measurement.

3. The method of claim 1, wherein step (c) comprises:
  (i) intermittently operating the at least one light source to emit light for a second duration of time;
  (ii) operating the second light sensing device forming the second sensing volume to detect and measure the light emitted from the at least one light source to establish the second reading; and
  (iii) operating the processing device to compare the second reading and the second baseline measurement.

4. The method of claim 1, wherein
step (d) comprises:
  (i) intermittently operating the at least one light source to emit light for a third duration of time;
  (ii) operating the third light sensing device forming the third sensing volume to detect and measure the light emitted from the at least one light source to establish the third reading and the fourth reading; and
  (iii) operating the processing device to compare the third reading to the third baseline measurement and the fourth reading to the fourth baseline measurement.

5. The method of claim 1, further comprising:
(e) annunciating a warning signal if the third reading is outside of the third sensing threshold, and the fourth reading is outside of the fourth sensing threshold.

6. A chamber-less smoke detector comprising: a casing;
at least two light sources disposed within the casing, the at least two light sources configured to emit a light at different wavelengths, wherein a first light source of the at least two light sources is configured to emit infrared light and a second light source of the at least two light sources is configured to emit visible light; and
at least three light sensing devices wherein each comprises a photodiode within different regions of the smoke detector and each being disposed within he casing to establish at least three sensing volumes that are overlapping,
wherein each one of the at least three sensing volumes is formed by an overlap of emissions from the at least two light sources having a mutually unique angle of coincidence with a respective one of the at least three light sensing devices,
wherein:
  a first light sensing device of the at least three light sensing devices defines a forward-scatter sensing detection volume formed by an overlap of emissions from the first light source and the second light source, wherein the first and second light sources have a first angle of coincidence with the first light sensing device;
  a second light sensing device of the at least three light sensing devices defines a first back-scatter sensing detection volume formed by an overlap of emissions from of the first light source and the second light source, wherein the first and second light sources have a second angle of coincidence with the second light sensing device; and
  a third light sensing device of at least three light sensing devices defines a second back-scatter sensing detection volume formed by an overlap of emissions from the first light source and the second light source, wherein the first and second light sources have a third angle of coincidence with the third light sensing device, wherein the first, second, and third angles of coincidence differ from each other,
wherein the smoke detector is configured to:
(a) establishing and periodically updating a baseline measurement for each of the at least three sensing volumes by;
establishing a first baseline for the forward-scatter sensing detection volume by: intermittently operating the first and the second light sources, in sequence; and converting the incident light into an electric characteristic via the first light sensing device;
establishing a first baseline for the first back-scatter sensing detection volume by: intermittently operating the first and the second light sources, in sequence; and converting the incident light into an electric characteristic via the second light sensing device;
establishing a first baseline for the second back-scatter sensing detection volume by: intermittently operating the first and the second light sources, in sequence; and converting the incident light into an electric characteristic via the third light sensing device;
operating a processing device to store the baseline measurement for each of the at least three overlapping sensing volumes;

(b) comparing a first reading of the forward-scatter sensing detection volume and the first baseline measurement to form a first detection measurement, and
determining whether the first detection measurement is within a first sensing threshold of the first baseline;
(c) when the first detection measurement is outside of the first sensing threshold of the first baseline:
comparing first reading and a second reading of the forward-scatter sensing detection volume and the first back-scatter sensing detection volume and the first and second baseline measurements to form the first detection measurement and a second detection measurement; and
determining whether the first detection measurement and the second detection measurement are within the first sensing threshold and second sensing threshold of the first and second baselines, respectively;
(d) when the first and second detection measurements are outside of the first and second sensing thresholds of the first and second baselines, respectively:
comparing a third reading and fourth reading of the second back-scatter sensing detection volume and the third and fourth baseline measurements to form a third detection measurement, and a fourth detection measurement: and
determining whether the third detection measurement and the fourth detection measurement are within a third sensing threshold and a fourth sensing threshold of the third and fourth baselines, respectively, to thereby determine whether there is smoke,
wherein the third sensing threshold is directed to infrared light and the fourth sensing threshold is directed to visible light.

7. The chamber-less smoke detector of claim 6, further comprising
a processing device in communication with the at least three light sensing devices and the at least two light sources,
wherein the processing device is configured:
(a) to intermittently operate the at least two light sources to emit light at different wavelengths;
(b) store measurements from the at least three sensors; and
(c) compare a current reading from the at least three sensors to the stored measurements.

8. A method of operating a chamber-less smoke detector, the chamber-less smoke detector including at least two light sources, wherein a first light source of the at least two light sources is configured to emit infrared light and a second light source of the at least two light sources is configured to emit visible light,
at least three light sensing devices within different regions of the smoke detector, wherein each comprises a photodiode, and
at least three overlapping sensing volumes, wherein each one of the at least three sensing volumes is formed by an overlap of emissions from the at least two light sources having a mutually unique angle of coincidence with a respective one of the at least three light sensing devices,
wherein:
  a first light sensing device of the at least three light sensing devices defines a forward-scatter sensing detection volume formed by an overlap of emissions from the first light source and the second light source, wherein the first and second light sources have a first angle of coincidence with the first light sensing device;

a second light sensing device of the at least three light sensing devices defines a first back-scatter sensing detection volume formed by an overlap of emissions from the first light source and the second light source, wherein the first and second light sources have a second angle of coincidence with the first light sensing device; and a third light sensing device of the at least three light sensing devices defines a second back-scatter sensing detection volume formed by an overlap of emissions from the first light source and the second light source, wherein the first and second light sources have a third angle of coincidence with the third light sensing device, wherein the first, second, and third angles of coincidence differ from each other, the method comprising:

(a) establishing at least one baseline measurement for the at least three overlapping sensing volumes by:
 (i) intermittently operating at least one light source of the at least two light sources to emit light;
 (ii) operating the at least three light sensing devices, positioned at differing scattering angles, to detect and measure the emitted light in the at least three overlapping sensing volumes;
 (iii) calculating at least one ratio of light detected within each of the at least three sensing volumes to create the at least one baseline measurement: and
 (iv) operating the processing device to store the at least one baseline measurement;

(b) operating in a detection mode by:
 (i) intermittently operating at least one light source of the at least two light sources to emit a light;
 (ii) operating the at least three light sensing devices to detect and measure the emitted light in the at least three overlapping sensing volumes to create at least one detection measurement; and (c) determining whether at least one ratio measurement is within a ratio threshold, by:
 (i) operating the processing device to adjust the at least one detection measurement by the respective at least one baseline measurement to create at least one ratio of adjusted detection measurement; and
 (ii) comparing the at least one ratio of adjusted detection measurement to the ratio threshold to determine whether there is smoke.

9. The method of claim 8, wherein step (b) comprises:

operating the processing device to store the at least one detection measurement.

10. The method of claim 8, further comprising:

(d) annunciating a warning signal if the at least one ratio measurement is greater than the ratio threshold.

* * * * *